(12) United States Patent
Sekiguchi et al.

(10) Patent No.: US 9,916,856 B2
(45) Date of Patent: Mar. 13, 2018

(54) PLAYING APPARATUS AND PLAYING METHOD

(71) Applicant: SONY CORPORATION, Tokyo (JP)

(72) Inventors: Koji Sekiguchi, Kanagawa (JP); Kimihiro Saito, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/543,152

(22) PCT Filed: Nov. 19, 2015

(86) PCT No.: PCT/JP2015/005785
§ 371 (c)(1),
(2) Date: Jul. 12, 2017

(87) PCT Pub. No.: WO2016/120924
PCT Pub. Date: Aug. 4, 2016

(65) Prior Publication Data
US 2018/0005662 A1 Jan. 4, 2018

(30) Foreign Application Priority Data

Jan. 30, 2015 (JP) .................................. 2015-016361

(51) Int. Cl.
*G11B 7/00* (2006.01)
*G11B 5/09* (2006.01)
(Continued)

(52) U.S. Cl.
CPC .... *G11B 20/10046* (2013.01); *G11B 7/00718* (2013.01)

(58) Field of Classification Search
CPC ... G11B 7/0945; G11B 7/0908; G11B 7/0901; G11B 7/0941; G11B 7/094; G11B 7/131;
(Continued)

(56) References Cited

U.S. PATENT DOCUMENTS 8,068,389 B2 * 11/2011 Kobayashi .......... G11B 7/0906
369/44.25

FOREIGN PATENT DOCUMENTS

JP 2008-065961 A 3/2008
JP 2008-269680 A 11/2008
(Continued)

OTHER PUBLICATIONS

International Search Report and Written Opinion of PCT Application No. PCT/JP2015/005785, dated Feb. 9, 2016, 02 pages of English Translation and 06 pages of ISRWO.

*Primary Examiner* — Nabil Hindi
(74) *Attorney, Agent, or Firm* — Chip Law Group

(57) ABSTRACT

A set of first signal light and reference light with a phase difference of almost 0 degree, a set of second signal light and reference light with a phase difference of almost 180 degrees, a set of third signal light and reference light with a phase difference of almost 90 degrees, and a set of fourth signal light and reference light with a phase difference of almost 270 degrees are generated. A first differential signal as a difference between a first light-receiving signal obtained by a first light-receiving element and a second light-receiving signal obtained by a second light-receiving element is calculated, and a second differential signal as a difference between a third light-receiving signal obtained by a third light-receiving element and a fourth light-receiving signal obtained by a fourth light-receiving element is calculated. The first differential signal and the second differential signal are supplied to respective FIR filters. An equalization error is formed from output signals from the FIR filters. Tap coefficients for the FIR filters are controlled to minimize the equalization error.

6 Claims, 14 Drawing Sheets

(51) Int. Cl.
  *G11B 20/10*  (2006.01)
  *G11B 7/007*  (2006.01)
(58) Field of Classification Search
  CPC .............. G11B 7/005; G11B 20/10009; G11B 20/10055
  USPC ............ 369/44.41, 44.32, 44.36, 59.22, 103, 369/59.21, 53.28, 124.1, 124.12
  See application file for complete search history.

(56) References Cited

FOREIGN PATENT DOCUMENTS

| | | |
|---|---|---|
| JP | 2012-079385 A | 4/2012 |
| JP | 2013-054801 A | 3/2013 |
| JP | 2014-032728 A | 2/2014 |
| WO | 2010/103962 A1 | 9/2010 |
| WO | 2013/031120 A1 | 2/2013 |
| WO | 2013/031120 A1 | 3/2013 |

\* cited by examiner

▨ PORTION: WHEN PHASE $\varphi = 0$
▧ PORTION: PHASE $\Psi = 4\pi nd/\lambda$

PLAYING APPARATUS AND PLAYING METHOD

CROSS REFERENCE TO RELATED APPLICATIONS

This application is a U.S. National Phase of International Patent Application No. PCT/JP2015/005785 filed on Nov. 19, 2015, which claims priority benefit of Japanese Patent Application No. JP 2015-016361 filed in the Japan Patent Office on Jan. 30, 2015. Each of the above-referenced applications is hereby incorporated herein by reference in its entirety.

TECHNICAL FIELD

The present disclosure relates to a playing apparatus and a playing method that are applied to playing of optical media such as optical discs.

BACKGROUND ART

In a case where a multilayer optical disc is played, for example, there is a high possibility that the light amount of a signal reduces to cause an error in reading the signal. As a solution to this problem, there is known a homodyne detection method by which to amplify the detection signal by the use of light interference (refer to Patent Documents 1 and 2).

According to Patent Documents 1 and 2, as a homodyne method for detecting light resulting from interference between signal light and reference light, four sets of signal light and reference light with phase differences of 90 degrees are detected. Specifically, the sets of signal light and reference light with phase differences of 0, 90, 180, and 270 degrees are detected. Each of the detections is performed by detecting the intensity of light resulting from interference between the signal light and the reference light.

Further, Patent Document 3 describes a playing apparatus that uses the homodyne method for optical discs on which signals are recorded in both lands and grooves.

CITATION LIST

Patent Documents

Patent Document 1: Japanese Patent Application Laid-Open No. 2008-269680
Patent Document 2: Japanese Patent Application Laid-Open No. 2008-65961
Patent Document 3: Japanese Patent Application Laid-Open No. 2014-32728

SUMMARY OF THE INVENTION

Problems to be Solved by the Invention

Using the homodyne detection in the land-groove system makes it possible to separate a groove RF signal and a land RF signal and read them independently, thereby achieving a narrow track pitch. According to Patent Document 3, there is the need to set the difference in level between the land and the groove to provide a phase difference of 90 degrees between the reflection light from the land and the reflection light from the groove. However, the value of the level difference may fluctuate due to variations among optical discs, or the phase relationship fluctuates microscopically depending on the condition of the optical disc, thereby resulting in the degradation of signal quality.

Therefore, an object of the present disclosure is to provide a playing apparatus and a playing method that employ the homodyne detection method and allow favorable playing of land/groove recording-type optical media.

Solutions to Problems

To solve the foregoing problems, the present disclosure is a playing apparatus including:
an optical system that irradiates a recording medium on which signals are recorded in both a land and a groove with light emitted from a light source to obtain signal light reflecting both recorded signals of the land and the groove, generates reference light from the light emitted from the light source, and generates a set of first signal light and reference light with a phase difference of almost 0 degree from overlapping light of the signal light and the reference light, a set of second signal light and reference light with a phase difference of almost 180 degrees from the same, a set of third signal light and reference light with a phase difference of almost 90 degrees from the same, and a set of fourth signal light and reference light with a phase difference of almost 270 degrees from the same;
a light-receiving unit that receives the set of first signal light and reference light by a first light-receiving element, the set of second signal light and reference light by a second light-receiving element, the set of third signal light and reference light by a third light-receiving element, and the set of fourth signal light and reference light by a fourth light-receiving element;
an arithmetic operation unit that calculates a first differential signal as a difference between a first light-receiving signal obtained by the first light-receiving element and a second light-receiving signal obtained by the second light-receiving element, and calculates a second differential signal as a difference between a third light-receiving signal obtained by the third light-receiving element and a fourth light-receiving signal obtained by the fourth light-receiving element;
a first FIR filter and a second FIR filter to which the first differential signal and the second differential signal are supplied, respectively; and
an equalization error detection unit that is supplied with an addition signal in which output signals from the first and second FIR filters are added up to form an equalization error, wherein
tap coefficients for the first and second FIR filters are controlled to minimize the equalization error.

The present disclosure is a playing method including:
irradiating a recording medium on which signals are recorded in both a land and a groove with light emitted from a light source to obtain signal light reflecting both recorded signals of the land and the groove, generating reference light from the light emitted from the light source, and generating by an optical system a set of first signal light and reference light with a phase difference of almost 0 degree from overlapping light of the signal light and the reference light, a set of second signal light and reference light with a phase difference of almost 180 degrees from the same, a set of third signal light and reference light with a phase difference of almost 90 degrees from the same, and a set of fourth signal light and reference light with a phase difference of almost 270 degrees from the same;
receiving the set of first signal light and reference light by a first light-receiving element, the set of second signal light and reference light by a second light-receiving element, the set of third signal light and reference light by a third light-receiving element, and the set of fourth signal light and reference light by a fourth light-receiving element;

calculating a first differential signal as a difference between a first light-receiving signal obtained by the first light-receiving element and a second light-receiving signal obtained by the second light-receiving element, and calculates a second differential signal as a difference between a third light-receiving signal obtained by the third light-receiving element and a fourth light-receiving signal obtained by the fourth light-receiving element;

supplying the first differential signal and the second differential signal to a first FIR filter and a second FIR filter, respectively;

supplying an addition signal in which output signals from the first and second FIR filters are added up to an equalization error detection unit to form an equalization error; and controlling tap coefficients for the first and second FIR filters to minimize the equalization error.

Effects of the Invention

According to at least one embodiment, it is possible to play land/groove recording-type optical recording media favorably using the homodyne detection method. The present disclosure eliminates the need to set the optical system in advance according to the individual grooves depths or set a phase offset in signal processing operations. Further, the present disclosure makes it possible to suppress degradation in signal quality resulting from a phase shift due to recording marks and disc conditions in contrast to the optical discs. Note that the advantages described herein are not limited ones but any one of the advantages described in the present disclosure may be applied.

MODE FOR CARRYING OUT THE INVENTION

The embodiments described below are favorable specific examples of the present disclosure with various technically preferable limitations. However, the scope of the present disclosure should not be limited by these embodiments unless the present disclosure is limited otherwise in the following description.

Note that the present disclosure will be explained in the following sequence:

<1. About the conventional homodyne detection method>
<2. About the improved homodyne detection method>
<3. First embodiment>
<4. Second embodiment>
<5. Modification example>

1. About the Conventional Homodyne Detection Method

Prior to the description of a playing method as an embodiment of the present disclosure, the conventional homodyne detection method and the improved homodyne detection method will be explained. As an example, the phase-diversity homodyne detection method will be explained below.

[Optical Recording Medium to be Played]

Figure 1:
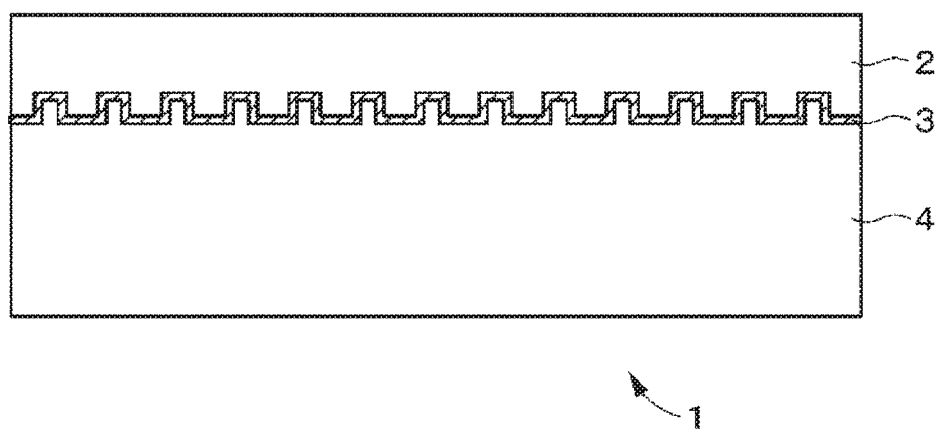
FIG. 1 is an explanatory diagram of a cross-section structure of an optical recording medium to be played.

FIG. 1 illustrates a cross-section structure of an optical recording medium 1 to be played. The rotationally driven optical recording medium 1 is irradiated with laser light to reproduce recorded signals. The optical recording medium 1 is a ROM-type (playback-only) optical recording medium on which information is recorded by forming pits (emboss pits), for example.

As illustrated in FIG. 1, the optical recording medium 1 has a cover layer 2, a recording layer (reflection film) 3, and a substrate 4 formed in sequence from the upper side. Here, the term "upper side" here refers to the upper side of the disc surface on which the laser light from the playing apparatus is incident. That is, in this case, the laser light is incident on the cover layer 2 of the optical recording medium 1.

In the optical recording medium 1, the substrate 4 is formed from a resin such as polycarbonate, for example. The upper side of the substrate 4 has a concave-convex cross section due to the formation of pits on the upper side. The substrate 4 with the pits is generated by ejection molding with a stamper, for example.

Then, a reflection film made of a metal or the like, for example, is formed on the concave-convex upper side of the substrate 4 to produce the recording layer 3. In this case, the optical recording medium 1 to be played by the conventional homodyne detection has tracks as pit rows with a general track pitch within the optical limit. That is, the track pitch in the recording layer 3 is set to be larger than the optical limit of which the theoretical value is represented as "λ/NA/2" (λ represents the playing wavelength and NA represents the numerical aperture of an object lens).

The cover layer 2 formed on the upper side of the recording layer 3 is formed by applying an ultraviolet curable resin, for example, by spin-coating or the like, and then performing cure treatment by ultraviolet irradiation. The cover layer 2 is provided to protect the recording layer 3.

Figure 2A:
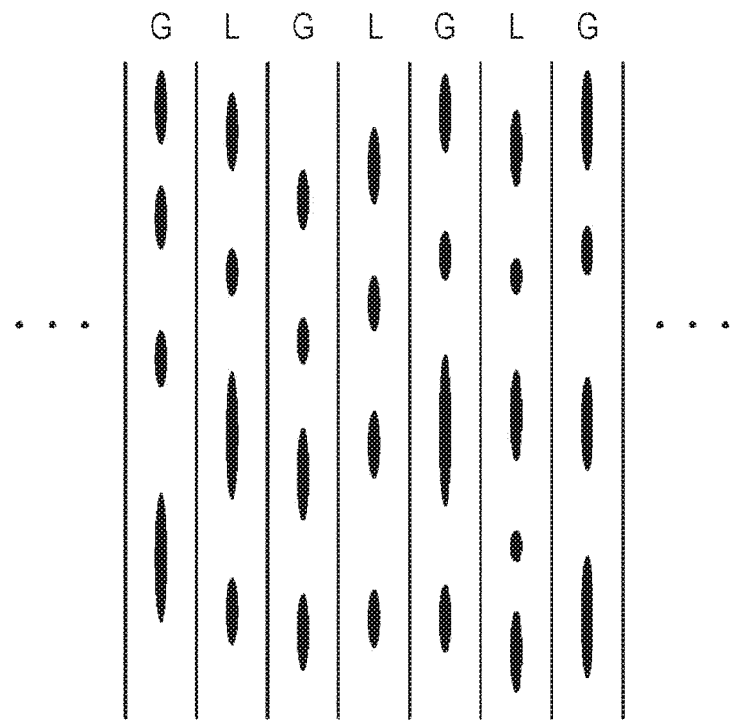
FIGS. 2A and 2B are explanatory diagrams of a structure of a recording surface of the optical recording medium to be played.
Figure 2B:
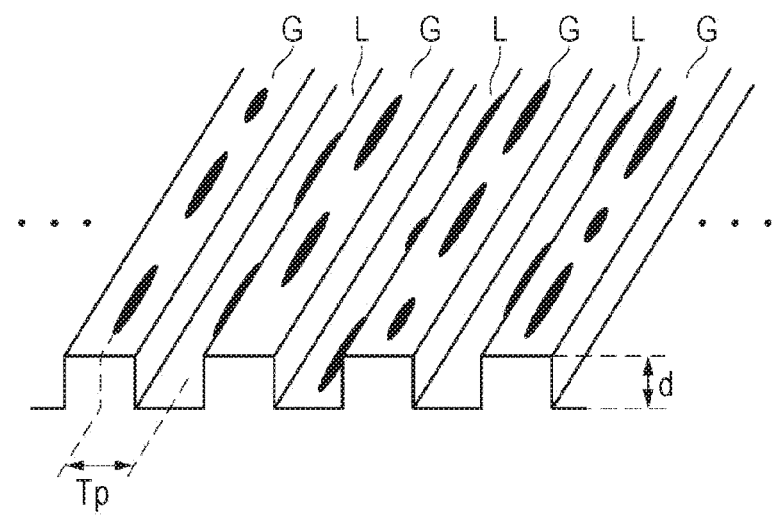

FIGS. 2A and 2B illustrate a structure of a recording surface of the optical recording medium 1 to be played. FIG. 2A is an enlarged partial plan view of the recording surface, and FIG. 2B is an enlarged partial perspective view of the recording surface. Note that FIG. 2B illustrates the surface of the optical recording medium 1 that is irradiated with laser light for playing. That is, the laser light for playing is applied from the upper side of the drawing. The optical recording medium 1 has grooves G and lands L. In the description herein, the grooves G are on the side the laser light for playing reaches earlier, that is, on the convex side, and the lands L are on the concave side, as in the case of the Blu-ray disc (BD) (registered trademark).

The optical recording medium 1 to be played has pit rows formed both in the grooves G and the lands L. When the pit rows are regarded as tracks, a track pitch Tp can be defined as a formation pitch of the lands L and the grooves G as illustrated in FIG. 2B. Setting the track pitch Tp to be narrow beyond the optical limit value improves the density of information recording. For example, when the formation pitch of the grooves G in the optical recording medium 1 is equal to the track pitch (the formation pitch of the pit rows) in a conventional optical recording medium, the optical recording medium 1 is nearly doubled in the density of information recording.

The level difference (also called depth as appropriate) between the lands L and the grooves G is designated as d. When the refractive index of the optical recording medium 1 is designated as n, for example, the depth d is "λ/8/n." Under the conditions that the playing wavelength λ is 405 nm and n is 1.5, for example, the depth d is about 33 nm.

Figure 3:
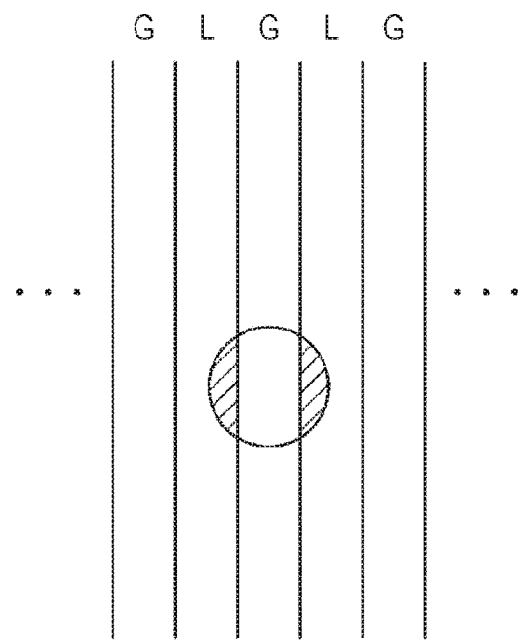
FIG. 3 is a schematic diagram illustrating relationships among a beam spot of playing light formed on the recording surface, lands, and a groove.

Here, in the optical recording medium 1 of the embodiment, the formation pitch of the lands L and the grooves G exceeds the optical limit value, the relationship between a beam spot of playing light formed on the recording surface, the lands L and the grooves G are as illustrated in FIG. 3, for example.

As in the conventional case, the tracking servo control of the object lens is performed on the grooves G or the lands L. In the example of FIG. 3, a case where the tracking servo control of the object lens is performed on the grooves G is illustrated. In this case, it is understood that there is a mixture of recording information on two adjacent lands L in the playback signal of the groove G as a servo target.

Figure 4:
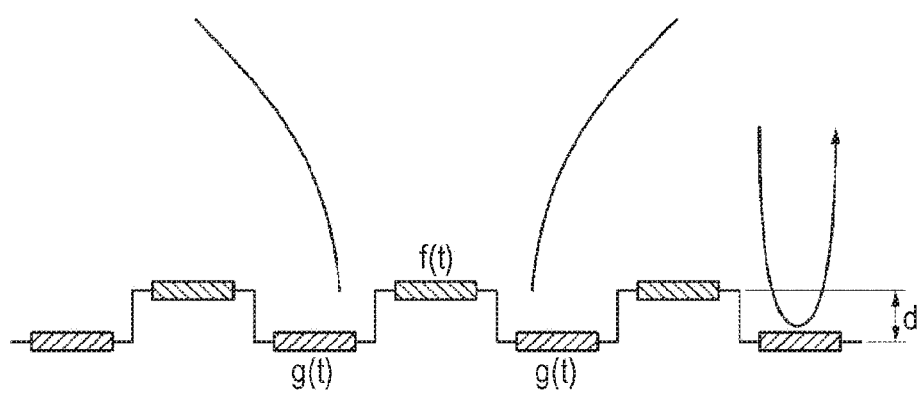
FIG. 4 is a schematic diagram describing the playing state of the optical recording medium.

Specifically, when the track pitch becomes narrow in the land/groove recording method, a crosstalk occurs from adjacent tracks. As illustrated in FIG. 4, in the case of playing the grooves, playback signals f(t) of the grooves are mixed with playback signals g(t) of the adjacent lands. When a phase φ of the groove playback signals is 0, a phase Ψ of the lands is 4πnd/λ (Δ represents wavelength and n represents the refractive index of the substrate of the optical recording medium 1).

[Homodyne Detection Method in the Phase Diversity System]

In the phase diversity system, four sets of signal light and reference light with phase differences of 90 degrees are used. Specifically, in the phase diversity system, the sets of signal light and reference light adjusted to have phase differences of almost 0, 180, 90, and 270 degrees are detected. Each of the detection is performed by detecting the intensity of light resulting from interference between the signal light and the reference light.

Figure 5:
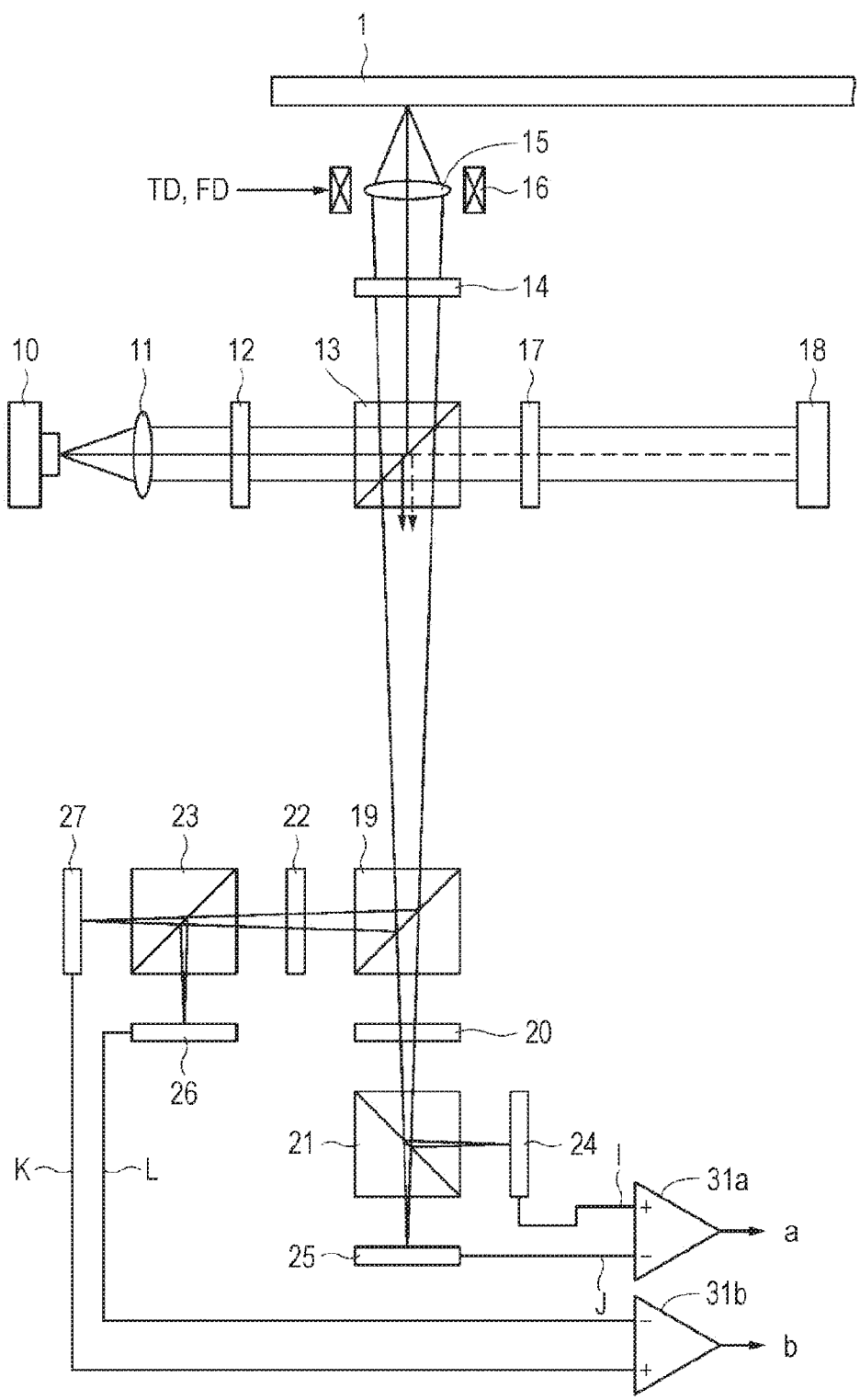
FIG. 5 is a schematic diagram of a configuration of an optical system for use in a playing apparatus.

FIG. 5 illustrates mainly a configuration of an optical system for use in the phase diversity system. When being loaded into the playing apparatus, the optical recording medium 1 is rotationally driven by a spindle motor. The optical system includes a laser (semiconductor laser) 10 as a laser light source for playing. The laser light emitted from the laser 10 is turned into parallel light via a collimation lens 11, and then enters a polarization beam splitter 13 via a ½ wavelength plate 12.

In this case, the polarization beam splitter 13 is configured to transmit P polarized light and reflect S polarized light, for example. The attachment angle of the ½ wavelength plate 12 (angle of rotation around an optical axis in the incident plane of the laser light) is adjusted such that the ratio of the light output by passing through the polarization beam splitter 13 (P polarized light component) to the light output by reflecting on the polarization beam splitter 13 (S polarized light component) (that is, the ratio of light splitting by the polarization beam splitter 13) is, for example, almost 1:1.

The laser light reflected by the polarization beam splitter 13 is passed through a ¼ wavelength plate 14 and then is collectively emitted to the recording layer on the optical recording medium 1 via an object lens 15 held by a biaxial actuator 16.

The biaxial actuator 16 holds the object lens 15 to be displaceable in a focus direction (direction of moving toward and away from the optical recording medium 1) and a tracking direction (radial direction of the optical recording medium 1 orthogonal to the focus direction). The biaxial actuator 16 includes a focus coil and a tracking coil to which a focus drive signal FD and a tracking drive signal TD described later are supplied, respectively. The object lens 15 displaces in the focus direction or the tracking direction according to the focus drive signal FD or the tracking drive signal TD.

The reflection light from the recording layer on the optical recording medium 1 enters the polarization beam splitter 13 via the object lens 15 and the ¼ wavelength plate 14. The reflection light (return light) having entered the polarization beam splitter 13 is made different in polarization direction by 90 degrees from the light having entered from the laser 10 side and reflected on the polarization beam splitter 13 (outward light) by the action of the ¼ wavelength plate 14 and the action of the reflection on the recording layer. That is, the reflection light enters the polarization beam splitter 13 as P polarized light. Accordingly, the reflection light passes through the polarization beam splitter 13. Note that in the following description, the reflection light reflecting the recorded signal of the optical recording medium 1 and passing through the polarization beam splitter 13 will be called signal light.

Referring to FIG. 5, the laser light (P polarized light) having been emitted from the laser 10 and passed through the polarization beam splitter 13 acts as reference light in the homodyne detection system. After having passed the polarization beam splitter 13, the reference light then passes through a ¼ wavelength plate 17 illustrated in the drawing, and is reflected on a mirror 18, and enters the polarization beam splitter 13 again through the ¼ wavelength plate 17.

In this case, the reference light (return light) entering the polarization beam splitter 13 is made different in polarization direction by 90 degrees from the reference light as the outward light by the action of the ¼ wavelength plate 17 and the action of the reflection on the mirror 18 (that is, S polarized light). Therefore, the reference light as the return light is reflected by the polarization beam splitter 13.

FIG. 5 illustrates the reference light reflected by the polarization beam splitter 13 by a dashed arrow, and illustrates the signal light having passed through the polarization beam splitter 13 as a solid arrow. The polarization beam splitter 13 emits the signal light and the reference light in an overlapping state in the same direction. In this case, specifically, the signal light and the reference light overlap with their light axes aligned and are emitted in the same direction. Here, the reference light is coherent light.

The overlapping signal light and reference light output from the polarization beam splitter 13 enter a half beam splitter 19. The half beam splitter 19 splits the incident light into the reflection light and the transmission light at a ratio of almost 1:1.

The overlapping signal light and reference light having passed through the half beam splitter 19 enter a polarization beam splitter 21 via a ½ wavelength plate 20. Meanwhile, the overlapping signal light and reference light reflected by the half beam splitter 19 enter a polarization beam splitter 23 via a ¼ wavelength plate 22.

The ½ wavelength plate 20 and the ¼ wavelength plate 22 rotate the polarization plane. Therefore, the ratio of light amounts branched by the polarization beam splitter 21 can be adjusted by combining the ½ wavelength plate 20 and the polarization beam splitter 21. Similarly, the ratio of light amounts branched by the polarization beam splitter 23 can be adjusted by the ¼ wavelength plate 22.

The light amounts branched by the polarization beam splitter 21 and the polarization beam splitter 23 are set to be almost 1:1. The light having been reflected by the polarization beam splitter 21 enters a light detection unit 24, and the light having passed through the polarization beam splitter 21 enters a light detection unit 25. The light having been reflected by the polarization beam splitter 23 enters a light detection unit 26, and the light having passed through the polarization beam splitter 23 enters a light detection unit 27.

A light-receiving signal output from the light detection unit 24 will be designated as I, a light-receiving signal output from the light detection unit 25 as J, a light-receiving signal output from the light detection unit 26 as L, and a light-receiving signal output from the light detection unit 27 as K.

These light-receiving signals I to L are supplied to subtraction circuits 31a and 31b. The light-receiving signals I and J are supplied to the subtraction circuit 31a, and the subtraction circuit 31a generates a differential signal a (a=I−J), and the subtraction circuit 31b generates a differential signal b (b=K−L).

Figure 6:
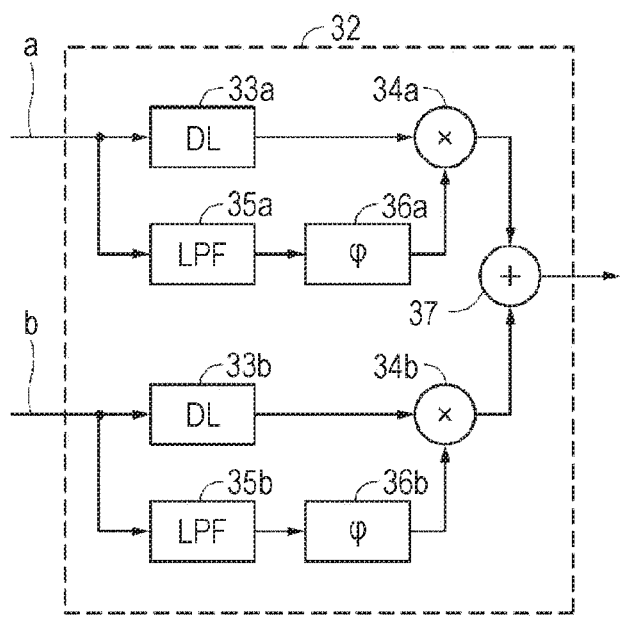
FIG. 6 is a block diagram of a signal generation system in a conventional playing apparatus using a phase diversity method.

As illustrated in FIG. 6, the foregoing differential signals a and b are supplied to an arithmetic operation circuit 32. The arithmetic operation circuit 32 has delay circuits 33a and 33b, multiplication circuits 34a and 34b, low-pass filters 35a and 35b, offset ($\phi$) setting circuits 36a and 36b, and an addition circuit 37. The delay circuit 33a has a delay time that is equal to a delay amount generated in the low-pass filter 35a and the offset ($\phi$) setting circuit 36a. The delay circuit 33b has a delay time that is equal to a delay amount generated in the low-pass filter 35b and the offset ($\phi$) setting circuit 36b. The output of the multiplication circuit 34a and the output of the multiplication circuit 34b are supplied to the addition circuit 37. A playback signal is retrieved from the output of the addition circuit 37.

The foregoing playing apparatus can obtain a playback signal under no influence of the component of a phase shift ($\theta(t)$) of the reference light due to the surface deflection of the optical recording medium 1 or the like as described below.

The light-receiving signals I to L are represented by the equations shown below. The meanings of each of the terms in the equations are as follows:

R: Reference light component

A: Reflection component of a mirror plane (land portion) formed on the recording surface of the optical recording medium f: Modulated component according to the presence or absence of pits (taking on a positive or negative value)

t: Sampling time $\phi$: Phase equivalent to pit depth (optical depth) or the like $\theta$: Light path length difference between the signal light and the reference light (resulting mainly from the surface deflection of the optical recording medium 1)

Figure 7:
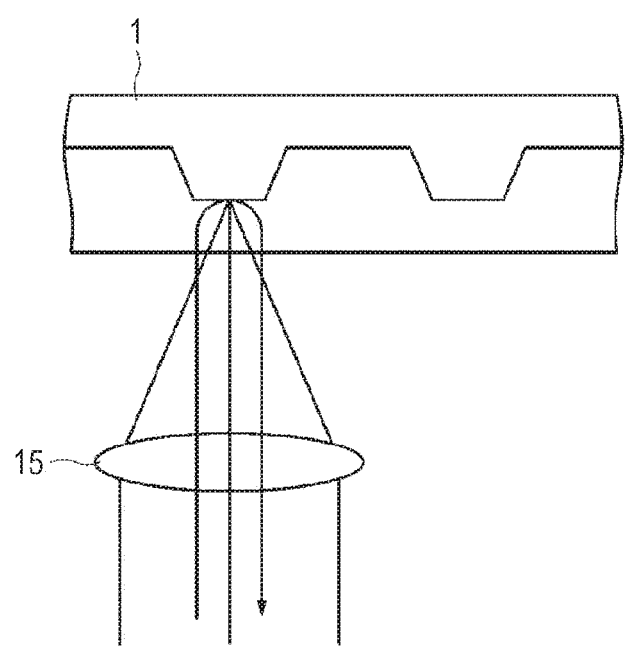
FIG. 7 is a schematic diagram describing the playing state of the optical recording medium.

As illustrated in FIG. 7, when the signal surfaces of the object lens 15 and the optical recording medium 1 change due to the surface deflection, the light path length of the signal light changes accordingly. Meanwhile, the reference light reflects on the mirror 18 and thus its light path length does not change. Consequently, the phase difference between the signal light and the reference light shifts from the set value. The component of the phase shift is $\theta(t)$.

[Mathematical Formula 1]

$$4I = |A + f(t)e^{i\phi} + Re^{i\theta}|^2 = (A + f\cos\phi + R\cos\theta)^2 + (f\sin\phi + R\sin\theta)^2 \quad (1)$$

[Mathematical Formula 2]

$$4J = |A + f(t)e^{i\phi} - Re^{i\theta}|^2 = (A + f\cos\phi - R\cos\theta)^2 + (f\sin\phi - R\sin\theta)^2 \quad (2)$$

[Mathematical Formula 3]

$$4K = |A + f(t)e^{i\phi} + iRe^{i\theta}|^2 = (A + f\cos\phi - R\sin\theta)^2 + (f\sin\phi + R\cos\theta)^2 \quad (3)$$

[Mathematical Formula 4]

$$4L = |A + f(t)e^{i\phi} - iRe^{i\theta}|^2 = (A + f\cos\phi + R\sin\theta)^2 + (f\sin\phi - R\cos\theta)^2 \quad (4)$$

The differential signal a (=I−J) of the subtraction circuit 31a and the differential signal b (=K−L) of the subtraction circuit 31b are represented by the following formulas:

[Mathematical Formula 5]

$$a = I - J = (A + f\cos\phi)R\cos\theta + f\sin\phi R\sin\theta = AR\cos\theta + fR\cos(\phi - \theta) \quad (5)$$

[Mathematical Formula 6]

$$b = K - L = -(A + f\cos\phi)R\sin\theta + f\sin\phi R\cos\theta = -AR\sin\theta + fR\sin(\phi - \theta) \quad (6)$$

Figure 8A:
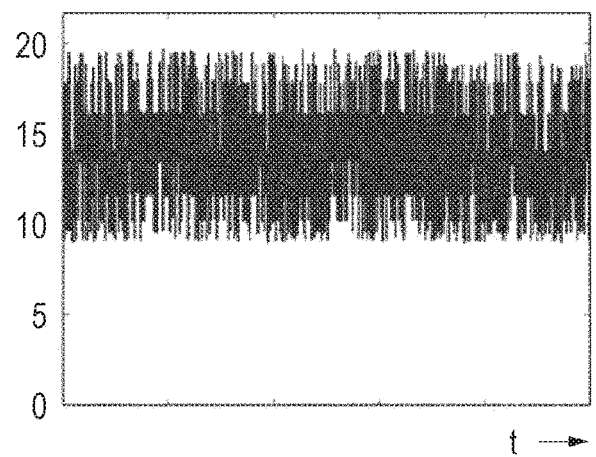
FIGS. 8A, 8B and 8C are schematic diagrams describing the phase diversity method.

In the normal detection method without homodyne detection, as illustrated in FIG. 8A, the DC component of the playback signal appears corresponding to the mirror portion in the background. In the case of the homodyne detection method, as illustrated in FIG. 8B, the DC components corresponding to the mirror portion wind due to the phase $\theta$ corresponding to the difference in the light path length of the reference light described above.

Figure 8B:
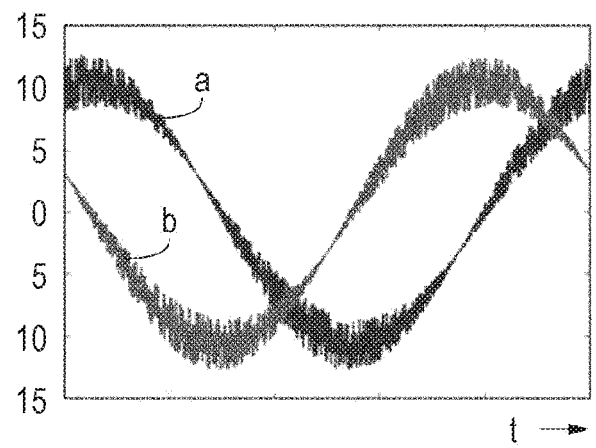
Figure 8C:
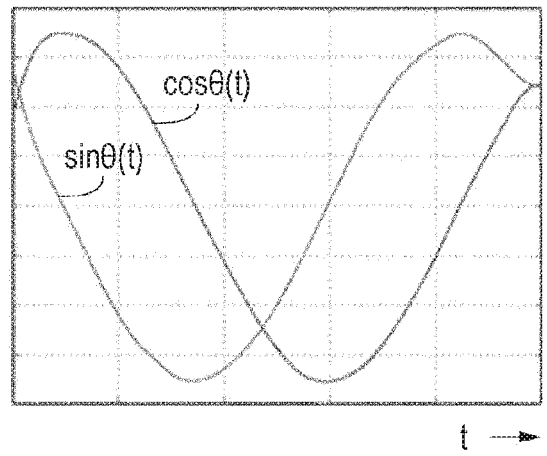

To determine the phase $\theta$, the differential signals a and b illustrated in FIG. 8B are supplied to the low-pass filters 35a and 35b. The low-pass filters 35a and 35b can be used to determine $\cos\theta(t)$ and $\sin\theta(t)$ as illustrated in FIG. 8C. Specifically, since, in Mathematical Formulas (5) and (6), f represents the modulated component due to the presence or absence of pits (taking on a positive or negative value), it is considered that the terms with the multiplication by the function f disappear and the terms sin θ and cos θ are left.

Since (tan θ=sin θ/cos θ), θ is determined from (arctan θ=θ) and φ (offset) is set. The multiplication circuit 34a multiplies a by cos(φ−θ(t)), and the multiplication circuit 34b multiplies b by sin(φ−θ(t)). Then, the addition circuit 37 adds up these multiplication outputs. The playback signal obtained from the addition circuit 37 is represented by the following formula:

[Mathematical Formula 7]

$$a \times \cos(\phi-\theta(t))+b \cdot \sin(\phi-\theta(t))=f(t)R+AR\cos\phi \qquad (7)$$

As understood from the foregoing mathematical formula, the playback signal becomes stabled without the component of θ(t). Note that as another homodyne detection method, the mirror 18 may be controlled in position to cancel out the phase difference between the signal light and the reference light resulting from the surface deflection. According to the phase diversity method, however, the configuration for position control of the mirror 18 can be omitted. Further, it is possible to obtain the playing result in which the component of the signal light is amplified by the component of the reference light. That is, the amplified recorded signal of the optical recording medium 1 is detected, thereby achieving improvement in SNR. Note that the term phase diversity method refers to the method by which to determine the playback signal by calculating the sum of squares ($a^2+b^2$) of the differential signals a and b or the square-root of sum of squares of the differential signals a and b. The term phase diversity method is also used herein for the arithmetic operation in which the multiplication circuit 34b multiplies a by cos(φ−θ(t)) and multiplies b by sin(φ−θ(t)) as described above.

Figure 9A:
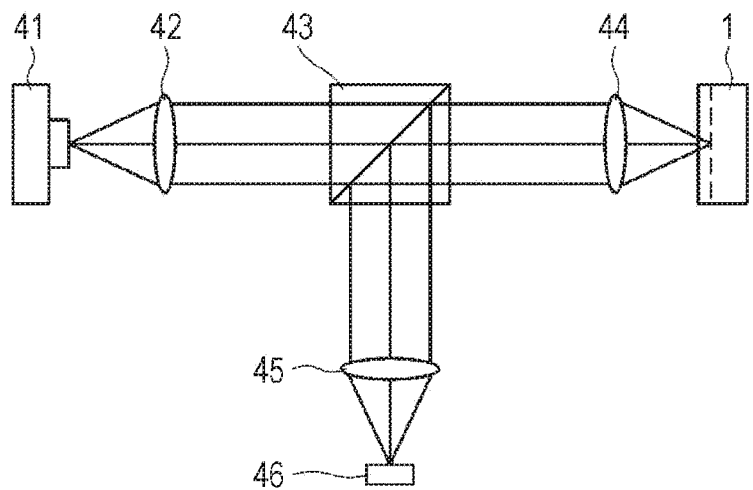
FIG. 9A is a schematic view of an optical system of simulation and FIG. 9B is a graph illustrating the result of a relationship between track pitch and jitter determined by simulation when the level difference between the land and the groove is set to different values.
Figure 9B:
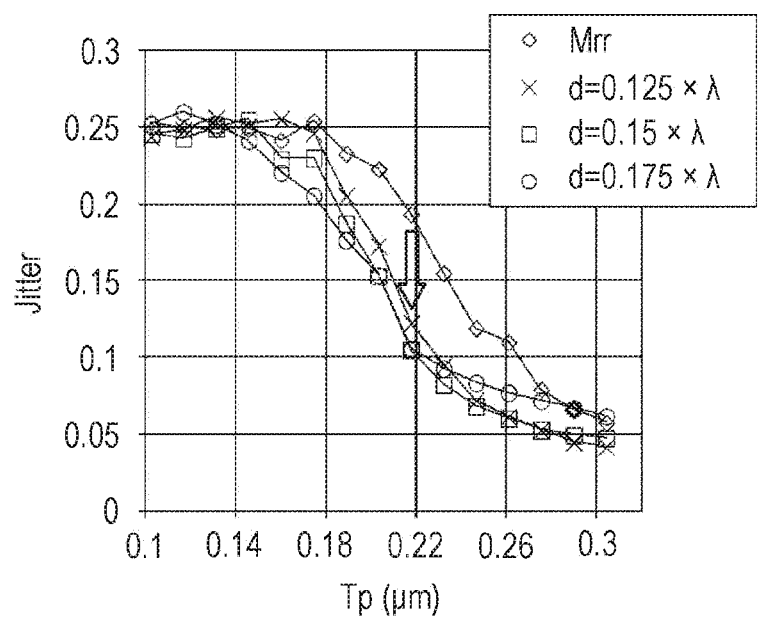

The graph in FIG. 9B illustrates the results of jitter of the playback signals (the playback signals of the grooves or the playback signals of the lands) determined by simulation in a case of changes in the track pitch Tp on the assumption that the optical recording medium for the land/groove recording as described above is played by the optical system illustrated in FIG. 9A. Note that the jitter is one of indexes of playing performance, and any index other than the jitter may be used instead.

As illustrated in FIG. 9A, the laser light from a laser diode 41 is applied to the signal surface of the optical recording medium 1 through a lens 42, a polarization beam splitter 43, and an object lens 44. The reflection light from the signal surface is reflected by the polarization beam splitter 43, and is supplied to a light detection unit 46 via a lens 45. Accordingly, the playback signal is obtained from the light detection unit 46. The playing optical system illustrated in FIG. 9A does not use the homodyne detection described above.

The simulation is carried out under the calculation conditions shown below. Note that a playing method capable of reduction in intertrack crosstalk is used on the assumption that there is no surface deflection.

λ=405 nm, NA=0.85, rim=65%/65%, groove duty=50%, inclination=90 degrees, mark reflectance=0%, mark width=0.9 Tp, and linear density=constant 25 GB The graph illustrated in FIG. 9B indicates changes in the value of jitter relative to Tp for each of (Mrr (meaning the mirror, d=0), (d=0.125λ), (d=0.15λ), and (d=0.175λ)). With (Tp=0.22), for example, the jitter can be made small relative to the groove depth except for the mirror. Additionally, the changes in the jitter can be made almost similar even with differences in the groove depth.

Figure 10A:
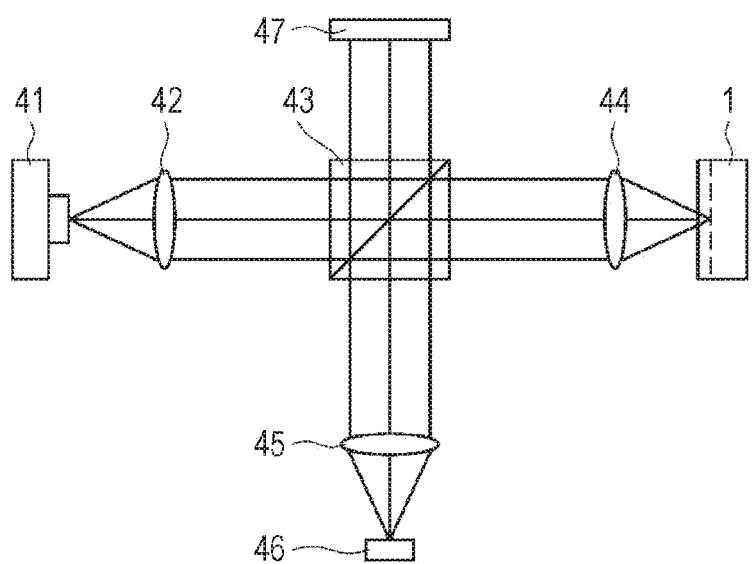
FIG. 10A is a schematic view of an optical system of simulation and FIG. 10B is a graph illustrating the result of a relationship between track pitch and jitter determined by simulation when the level difference between the land and the groove is set to different values.
Figure 10B:
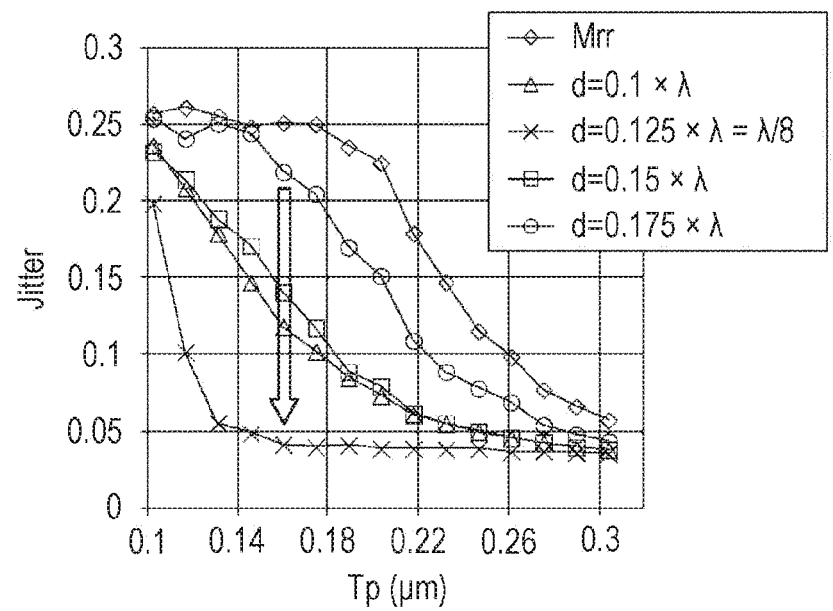

FIGS. 10A and 10B provide the results of simulation in a case of playing the optical recording medium 1 for the land/groove recording by the use of the homodyne detection method. As illustrated in FIG. 10A, a mirror 47 is provided so that the reflection light (signal light) from the optical recording medium 1 and the reflection light (reference light) from the mirror 47 are supplied to the light detection unit 46 via the lens 45.

The results of simulation in a case of using the optical system illustrated in FIG. 10A is illustrated in FIG. 10B. The calculation conditions for the simulation are similar to those in the case of FIG. 9B. The graph illustrated in FIG. 10B indicates changes in the value of jitter relative to Tp for each of (Mrr (meaning the mirror, d=0), (d=0.1λ), (d=0.125λ=λ/8), (d=0.15λ), and (d=0.175λ)).

For (Tp=0.15), for example, the jitter can be reduced relative to the mirror. However, the changes in the value of jitter vary depending on the value of the depth d. Specifically, the jitter can be significantly improved in the case of (d=0.125λ=λ/8), whereas the jitter is too large in the case of (d=0.175λ). Further, the value of the jitter cannot be said to be sufficiently favorable in the cases of (d=0.1λ) and (d=0.15λ). In the case of d=λ/8, a phase difference of 90 degrees can be made between the playback signal of the groove and the playback signal of the land, thereby reducing the crosstalk and setting the jitter to a favorable value.

As described above, the capability of obtaining favorable playing performance only in a case of the specific groove depth d constitutes a design restriction on the optical recording medium 1. In addition, the value of d=λ/8 is relatively large and cannot be said to be preferable for the surface on which marks are recorded in the lands between the grooves. Further, in a case where d is large, it is difficult to produce an optical disc with the wall surfaces of steps accurate without inclination. Therefore, it is preferable that the value of d is not limited to (λ/8).

2. About the Improved Homodyne Detection Method

Figure 11:
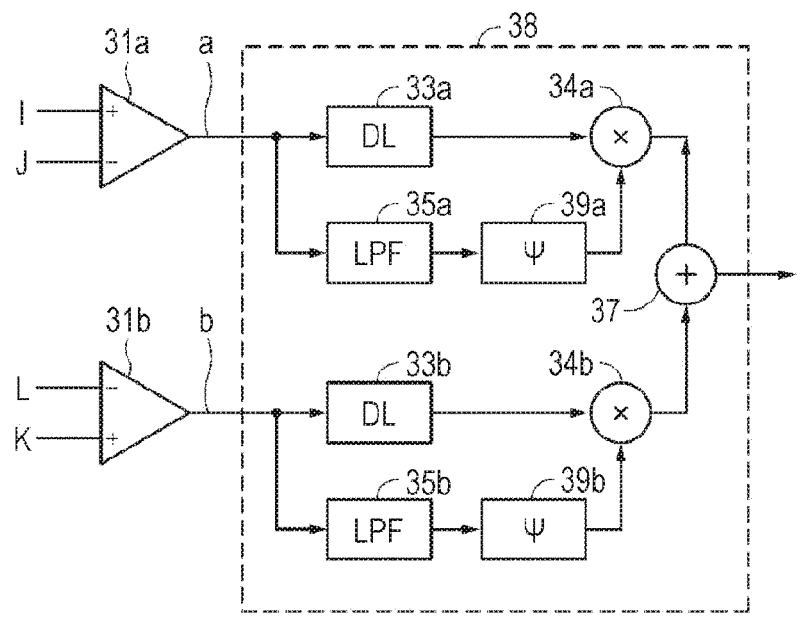
FIG. 11 is a block diagram of an improved homodyne-method signal generation system.

To solve this issue, a playing optical system similar to that illustrated in FIG. 5 and a playback signal generation circuit similar to that illustrated in FIG. 6 are used. The differential signals formed from the light-receiving signals I to L output from the light detection units 24 to 27 illustrated in FIG. 5, respectively, are supplied to the playback signal generation circuit configured as illustrated in FIG. 11.

The playback signal generation circuit includes subtraction circuits 31a and 31b and an arithmetic operation circuit 38. The light-receiving signals I and J are supplied to the subtraction circuit 31a, the subtraction circuit 31a generates a differential signal a (a=I−J), and the arithmetic operation circuit 31b generates a differential signal b (b=K−L). The differential signal a of the subtraction circuit 31a and the differential signal b of the subtraction circuit 31b are supplied to the arithmetic operation circuit 38.

The arithmetic operation circuit 38 has delay circuits 33a and 33b, multiplication circuits 34a and 34b, low-pass filters 35a and 35b, offset (Ψ) setting circuits 39a and 39b, and an addition circuit 37. The delay circuit 33a has a delay time that is equal to a delay amount generated in the low-pass filter 35a and the offset (Ψ) setting circuit 39a. The delay circuit 33b has a delay time that is equal to a delay amount generated in the low-pass filter 35b and the offset (Ψ) setting circuit 39b. The output of the multiplication circuit 34a and the output of the multiplication circuit 34b are supplied to the addition circuit 37. A playback signal is retrieved from the output of the addition circuit 37.

The offset ($\Psi$) setting circuits 39a and 39b set an offset of phase according to the level difference between the grooves G and the lands L, that is, according to the depth d as described below. The value of the depth d in the optical recording medium 1 to be played is known in advance, and therefore the offset $\Psi$ can be set.

According to the foregoing improved homodyne method, as described below, it is possible to obtain the playback signal from which intertrack crosstalk is removed under no influence of the component of the phase shift ($\theta(t)$) of the reference light resulting from the surface deflection of the optical recording medium 1 or the like. As explained above with reference to FIGS. 3 and 4, when the track pitch becomes narrow in the land/groove recording method, a crosstalk occurs from adjacent tracks. As illustrated in FIG. 4, in the case of playing the grooves, playback signals f(t) of the grooves are mixed with playback signals g(t) of the adjacent lands. When a phase $\phi$ of the groove playback signals is 0, a phase $\Psi$ of the lands is $4\pi nd/\lambda$ ($\lambda$ represents wavelength and n represents the refractive index of the substrate of the optical recording medium 1).

The playing optical system illustrated in FIG. 5 is used to determine the light-receiving signals I to L. As with the foregoing mathematical formulas, the meanings of each of the terms in the equations shown below are as follows:

R: Reference light component

A: Reflection component of a mirror plane (land portion) formed on the recording surface of the optical recording medium f: Modulated component according to the presence or absence of pits g: Crosstalk component from adjacent tracks t: Sampling time $\phi$: Phase equivalent to mark complex reflectivity and optical depth of guide groove or the like $\theta$: Light path length difference between the signal light and the reference light (resulting mainly from the surface deflection of the optical recording medium 1)

[Mathematical Formula 8]

$$4I = |A + f(t)e^{i\phi} + g(t)e^{i\psi} + Re^{i\theta}|^2 = (A + f\cos\phi + g\cos\psi + R\cos\theta)^2 + (f\sin\phi + g\sin\psi + R\sin\theta)^2 \quad (8)$$

[Mathematical Formula 9]

$$4J = |A + f(t)e^{i\phi} + g(t)e^{i\psi} - Re^{i\theta}|^2 = (A + f\cos\phi + g\cos\psi - R\cos\theta)^2 + (f\sin\phi + g\sin\psi - R\sin\theta)^2 \quad (9)$$

[Mathematical Formula 10]

$$4K = |A + f(t)e^{i\phi} + g(t)e^{i\psi} + iRe^{i\theta}|^2 = (A + f\cos\phi + g\cos\psi - R\sin\theta)^2 + (f\sin\phi + g\sin\psi + R\cos\theta)^2 \quad (10)$$

[Mathematical Formula 11]

$$4L = |A + f(t)e^{i\phi} + g(t)e^{i\psi} - iRe^{i\theta}|^2 = (A + f\cos\phi + g\cos\psi + R\sin\theta)^2 + (f\sin\phi + g\sin\psi - R\cos\theta)^2 \quad (11)$$

Further, the playback signal generation circuit illustrated in FIG. 11 is used to perform arithmetic operations. The differential signal a (=I−J) of the subtraction circuit 31a and the differential signal b (=K−L) of the subtraction circuit 31b are represented by the following formulas:

[Mathematical Formula 12]

$$a = I - J = (A + f\cos\phi + g\cos\psi)R\cos\theta + (f\sin\phi + g\sin\psi)R\sin\theta = AR\cos\theta + fR\cos(\phi-\theta) + gR\cos(\psi-\theta) \quad (12)$$

[Mathematical Formula 13]

$$b = K - L = -(A + f\cos\phi + g\cos\psi)R\sin\theta + (f\sin\phi + g\sin\psi)R\cos\theta = -AR\sin\theta + fR\sin(\phi-\theta) + gR\sin(\psi-\theta) \quad (13)$$

As described above, the low-pass filters 35a and 35b are used to determine $\cos\theta(t)$ and $\sin\theta(t)$. Specifically, since, in Mathematical Formulas (12) and (13), f represents the modulated component due to the presence or absence of pits (taking on a positive or negative value) and g represents the component of crosstalk from adjacent tracks, it is considered that the terms with the multiplication by the functions f and g disappear and the terms $\sin\theta$ and $\cos\theta$ are left. Since ($\tan\theta = \sin\theta/\cos\theta$), $\theta$ is determined from ($\arctan\theta = \theta$) and $\Psi$ (offset) is set by the offset ($\Psi$) setting circuits 39a and 39b. The multiplication circuit 34a multiplies a by $\cos(\Psi-\theta(t))$, and the multiplication circuit 34b multiplies b by $\sin(\Psi-\theta(t))$. Then, the addition circuit 37 adds up these multiplication outputs. The playback signal obtained from the addition circuit 37 is represented by the following formula:

[Mathematical Formula 14]

$$a \times \sin(\psi-\theta(t)) - b \times \cos(\psi-\theta(t)) = AR\cos\theta\sin(\psi-\theta) + AR\sin\theta\cos(\psi-\theta) + fR\cos(\phi-\theta)\sin(\psi-\theta) - fR\sin(\phi-\theta)\cos(\psi-\theta) = f(t)R\sin(\psi-\phi) + AR\sin\psi \quad (14)$$

As show in Mathematical Formula (14), the playback signal becomes stabled without the component of $\theta(t)$. In addition, the playback signal does not include the playback signal components g(t) of the adjacent tracks and therefore is clear of intertrack crosstalk. Note that the playback signal may be determined by calculating the sum of squares (a2+b2) of the differential signals a and b or the square-root of sum of squares of the differential signals a and b.

Figure 12:
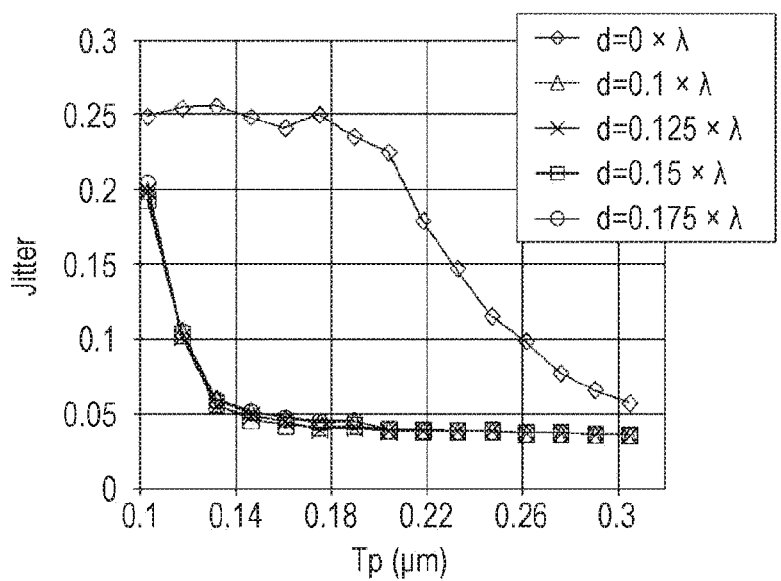
FIG. 12 is a graph illustrating the result of a relationship between track pitch and jitter in the improved homodyne-method signal generation system determined by simulation.

The results of simulation in a case of using an optical system similar to the optical system illustrated in FIG. 10A are illustrated in FIG. 12. The calculation conditions for the simulation are similar to those in the case of FIGS. 9B and 10B. The graph illustrated in FIG. 12 indicates changes in the value of jitter relative to Tp for each of (Mrr (meaning the mirror, d=0), (d=0.1$\lambda$), (d=0.125$\lambda$=$\lambda$/8), (d=0.15$\lambda$), and (d=0.175$\lambda$)).

As understood from the graph in FIG. 12, the jitter can be reduced for all the values of d except for the mirror. While the jitter can be significantly improved only in the case of (d=0.125$\lambda$=$\lambda$/8) in the case of FIG. 10B described above, the jitter can be significantly improved in a similar manner even with other values of d according to the improved homodyne method.

3. First Embodiment

The improved homodyne method described above makes it possible to remove the influence of a shift in the phase difference $\theta$ between the signal light and the reference light and remove the influence of the groove depth d by presetting the offset $\Psi$ according to the groove depth d. The arithmetic operation to this end uses the phase $\phi$ (equivalent to mark complex reflectivity and the optical depth of a guide groove). However, the groove depth d and the phase $\phi$ vary among discs and need to be set for the individual discs. Further, the groove depth d and the phase $\phi$ may fluctuate microscopically depending on the conditions of the optical recording medium (for example, an optical disc). Therefore, there is the possibility that no favorable playback signal can be obtained removing influence of the crosstalk from the adjacent tracks.

Figure 13:
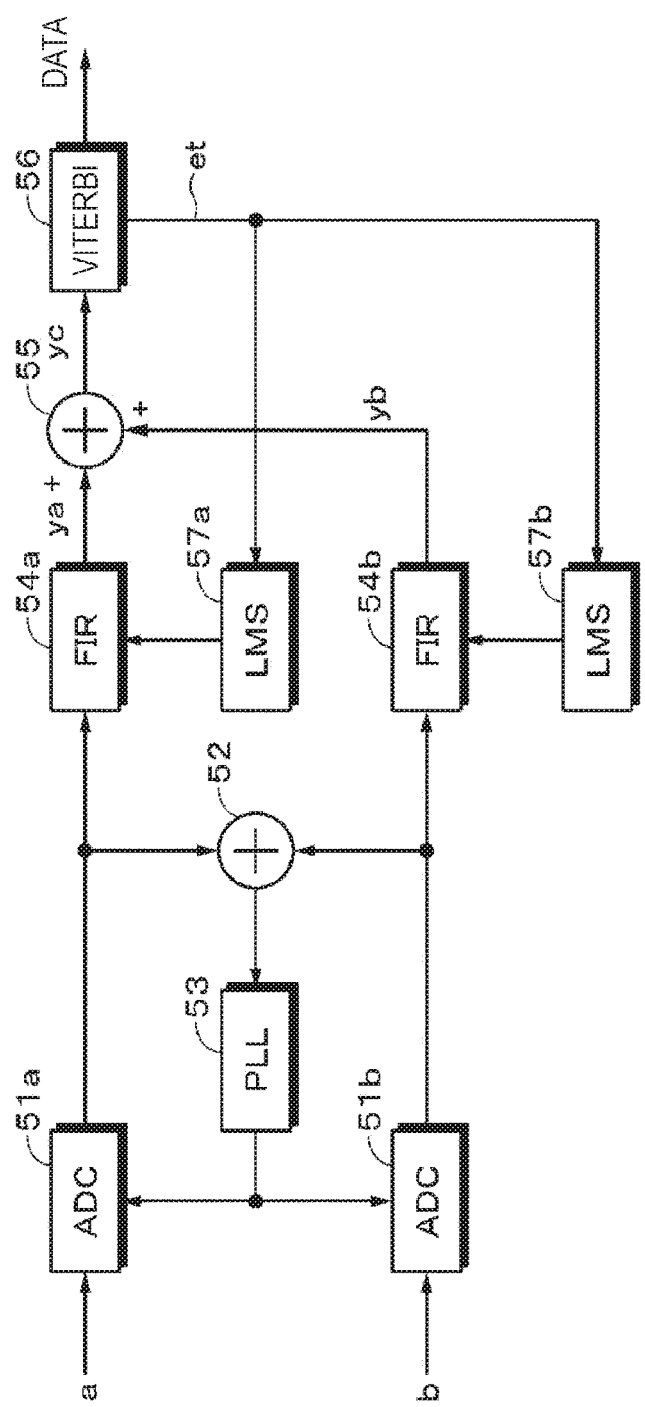
FIG. 13 is a block diagram describing a first embodiment of the present disclosure.

The present disclosure is devised in view of this respect. According to the present disclosure, the phase offset is not preset but is automatically corrected by adaptive equalization using a least mean square (LMS) algorithm. A configuration of a first embodiment will be explained with reference to FIG. 13. In the first embodiment, the grooves are subjected to a tracking servo as an example. In this example, the RF signal is read from the groove while suppressing crosstalk from the adjacent lands.

As described above, the differential signal a generated by the subtraction circuit 31a and the differential signal b generated by the subtraction circuit 31b are converted into digital differential signals by A/D converters 51a and 51b, respectively. An addition circuit 52 adds up the output signals from the A/D converters 51a and 51b, and the output of the addition circuit 52 is supplied to a phase locked loop (PLL) circuit 53. The PLL circuit 53 forms sampling clocks for the A/D converters 51a and 51b.

The output signals from the A/D converters 51a and 51b are supplied to finite impulse response (FIR) filters 54a and 54b as adaptive equalizers, respectively. The FIR filter 54a performs a partial response (PR) adaptive equalization process based on the differential signal a. The FIR filter 54b performs a PR adaptive equalization process based on the differential signal b.

An output signal ya from the FIR filter 54a and an output signal yb from the FIR filter 54b are supplied to an addition circuit 55. An output signal yc (=ya+yb) from the addition circuit 55 is input into a Viterbi detector 56.

The Viterbi detector 56 performs a maximum-likelihood decoding process on the equalized signal yc having undergone PR equalization to obtain binary data (RF signal). The used Viterbi detector includes a plurality of states with continuous bits of a predetermined length and branches represented by transitions between the states, and is configured to detect a desired one from all possible bit series in an efficient manner.

In the actual circuit, two registers are prepared for each state: one that is called path metric register for storing a partial response series and a path metric of a signal to the state; and the other that is called path memory register for storing a flow of a bit series to the state. Further, an arithmetic unit called branch metric unit is prepared for each branch to calculate a partial response series and a path metric of a signal in the bit.

The Viterbi detector 56 can associate various bit series with paths passing through the states one by one. In addition, the path metrics between the partial response series passing through these paths and the actual signal (RF signal) can be obtained by adding up in sequence the inter-state transitions constituting the paths, that is, the foregoing branch metrics in the branches.

Further, the selection of the paths to minimize the path metric can be achieved by comparing the path metrics of two or less branches to each of the states and selecting the paths with smaller path metrics in sequence. Transferring the selection information to the path memory register stores information on representation of the paths to each of the states in bit series. The value of the path memory register is sequentially updated and finally converged to the bit series with the minimum path metric, and then the final result is output.

Further, a PR convolver provided in the Viterbi detector 56 performs a convolution process on the result of the Viterbi detection to generate a target signal Zk. The target signal Zk is a noiseless ideal signal obtained by convolving the binary detection result. In the case of PR (1, 2, 2, 2, 1), for example, the impulse response for each channel clock is (1, 2, 2, 2, 1). The constraint length is 5. Further, in the case of PR (1, 2, 3, 3, 3, 2, 1), the impulse response for each channel clock is (1, 2, 3, 3, 3, 2, 1).

Then, the Viterbi detector 56 determines an equalization error et from the equalization signal yc from the addition circuit 55 and the target signal Zk, and supplies the same to LMS processors 57a and 57b. The LMS processors 57a and 57b determine adaptively tap coefficients for the FIR filters 54a and 54b by LMS algorithm operation between the equalization error et and the phase-separated data such that the square of the equalization error et becomes minimum.

Figure 14:
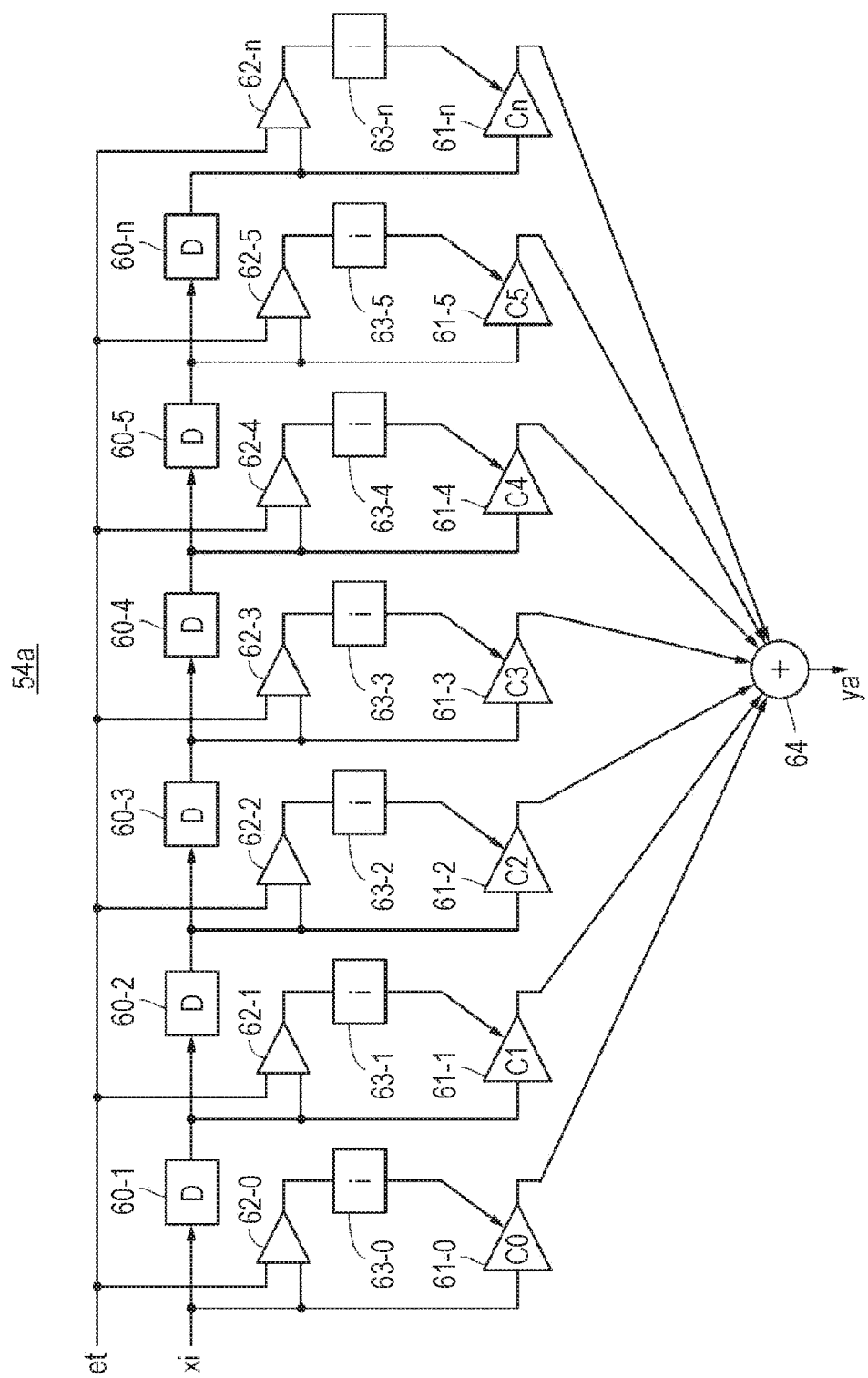
FIG. 14 is a block diagram of an example of an FIR filter.

FIG. 14 illustrates an example of the FIR filter 54a (the FIR filter 54b is also applicable to the example). The FIR filter 54a is a filter with n+1-stage taps including delay elements 60-1 to 60-$n$, coefficient multipliers 61-0 to 61-$n$, and an adder 64. The coefficient multipliers 61-0 to 61-$n$ multiply inputs x at respective points in time by tap coefficients C0 to Cn. The adder 64 adds up the outputs of the coefficient multipliers 61-0 to 61-$n$ and retrieves the addition result as output ya. The tap coefficients are set in advance to initial values.

The tap coefficients C0 to Cn are controlled to perform an adaptive equalization process. To this end, the equalization error et and arithmetic operators 62-0 to 62-$n$ into which each of the tap inputs are input for arithmetic operation are provided. In addition, integrators 63-0 to 63-$n$ are provided to integrate the outputs of the arithmetic operators 62-0 to 62-$n$, respectively. Each of the arithmetic operators 62-0 to 62-$n$ performs an operation of $-1*et*x$, for example, in which * represents multiplication. The outputs of the arithmetic operators 62-0 to 62-$n$ are integrated by the integrators 63-0 to 63-$n$, and the tap coefficients C0 to Cn of the coefficient multipliers 61-0 to 61-$n$ are changed and controlled according to the integration results. Note that the integrators 63-0 to 63-$n$ perform the integration to adjust the responsiveness of the adaptive coefficient control.

As described above, according to the first embodiment, it is possible to form the RF signal of the groove with the crosstalk component removed from the difference in signal quality between the groove playback signal and the land playback signal. Further, according to the first embodiment, it is possible to read the groove signal independently, for example, without having to preset the phase offset.

4. Second Embodiment

In a second embodiment, the preset phase offset is used to suppress degradation in signal quality due to fluctuations (perturbation factors). The differential signals a and b are subjected to an arithmetic operation using the preset phase offset. Consequently, the signals represented by the following Mathematical Formulas (15) and (16) can be read independently at the quality only with the phase shift due to the perturbation.

[Mathematical Formula 15]

$$a \times \sin(\psi - \theta(t)) - b \times \cos(\psi - \theta(t)) \quad (15)$$

[Mathematical Formula 16]

$$a \times \sin(\phi - \theta(t)) - b \times \cos(\phi - \theta(t)) \quad (16)$$

Figure 15:
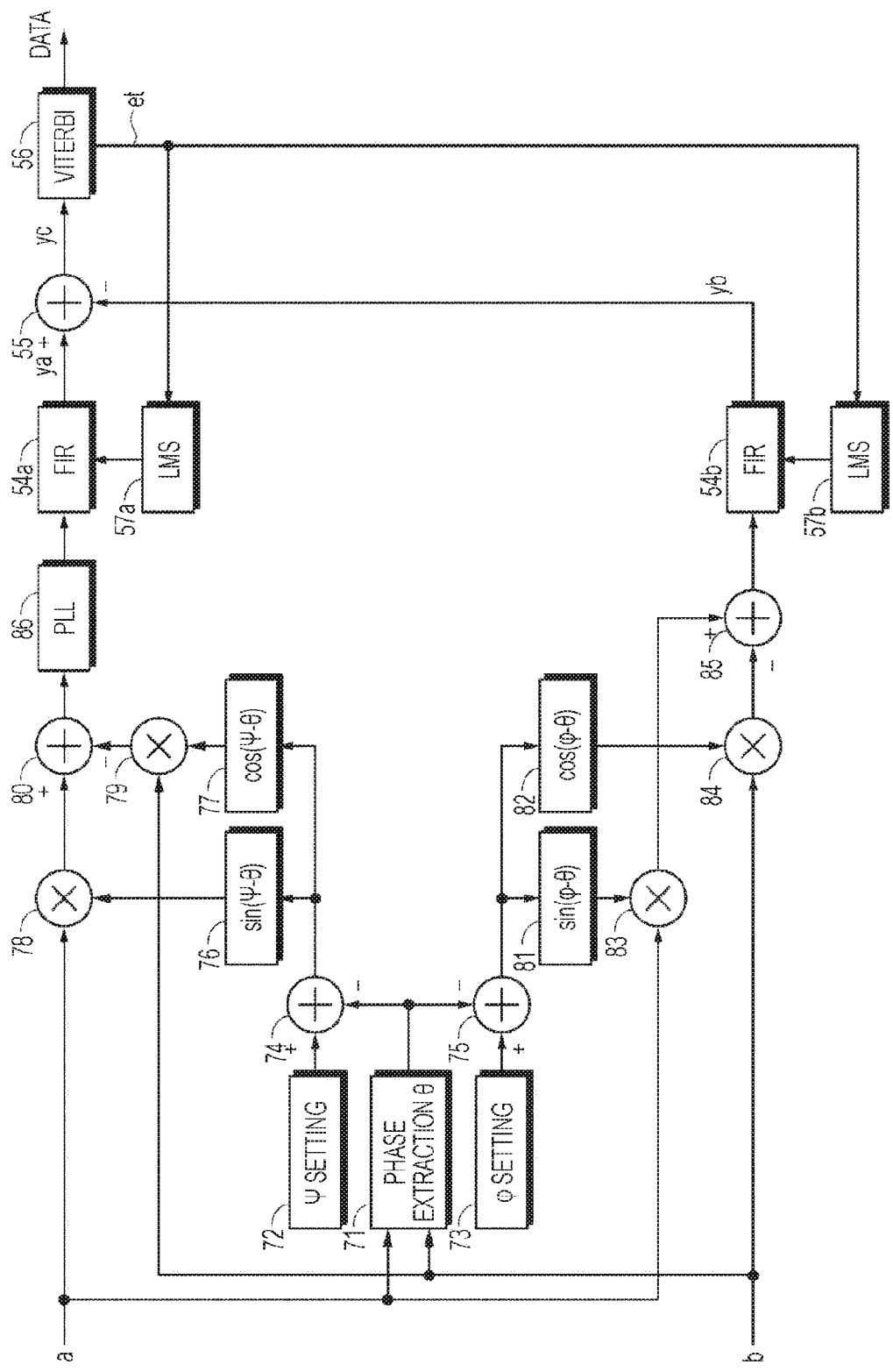
FIG. 15 is a block diagram describing a second embodiment of the present disclosure.

FIG. 15 is a configuration example describing the second embodiment. The differential signals a and b are supplied to a phase (θ) extraction circuit 71 to calculate the phases. Offset setting circuits 72 and 73 are provided to output the offset set to each optical disc to be played.

The output of the phase extraction circuit 71 and the output of the offset setting circuit 72 are supplied to a subtraction circuit 74, and a phase of (Ψ−θ) is obtained from the subtraction circuit 74. Signal generation circuits 76 and 77 generate a sine wave and a cosine wave in synchronization with the phase of (Ψ−θ). The differential signal a and the sine wave from the signal generation circuit 76 are supplied to a multiplication circuit 78, and an output signal from the multiplication circuit 78 is supplied to an addition circuit 80. The differential signal b and the cosine wave from the signal generation circuit 77 are supplied to a multiplication circuit 79, and an output signal from the multiplication circuit 79 is supplied to the addition circuit 80. A signal represented by Mathematical Formula (15) is retrieved from the output of the addition circuit 80.

The output of the phase extraction circuit 71 and the output of the offset setting circuit 73 are supplied to a subtraction circuit 75, and a phase of (φ−θ) is obtained from the subtraction circuit 75. Signal generation circuits 81 and 82 generate a sine wave and a cosine wave in synchronization with the phase of (φ−θ). The differential signal a and the sine wave from the signal generation circuit 81 are supplied to a multiplication circuit 83, and an output signal from the multiplication circuit 83 is supplied to the addition circuit 80. The differential signal b and the cosine wave from the signal generation circuit 82 are supplied to a multiplication circuit 84, and an output signal from the multiplication circuit 84 is supplied to an addition circuit 85. A signal represented by Mathematical Formula (16) is retrieved from the output of the addition circuit 85.

An output signal from the addition circuit 80 is supplied to a phase locked loop (PLL) circuit 86 for re-sampling using the playback signal from the groove. An output signal from the PLL circuit 86 is supplied to the FIR filter 54a. An output signal from the addition circuit 85 is supplied to the FIR filter 54b.

As in the first embodiment (FIG. 13) described above, the respective outputs ya and yb of the FIR filters 54a and 54b are supplied to the addition circuit 55, and the output yc of the addition circuit 55 is supplied to the Viterbi detector 56. The equalization error et from the Viterbi detector 56 is supplied to the LMS processors 57a and 57b, and the LMS processors 57a and 57b determine adaptively the tap coefficients for the FIR filters 54a and 54b.

According to the second embodiment described above, when the phase shift due to variable factors occurring in reality is corrected, it can be expected that the signal yb comes close to the crosstalk component from the land and the signal yc comes close to the signal from the groove without the crosstalk component removed. Accordingly, it can be expected to further improve the signal quality by adaptive equalization.

5. Modification Example

[Phase Extraction]

Figure 16:
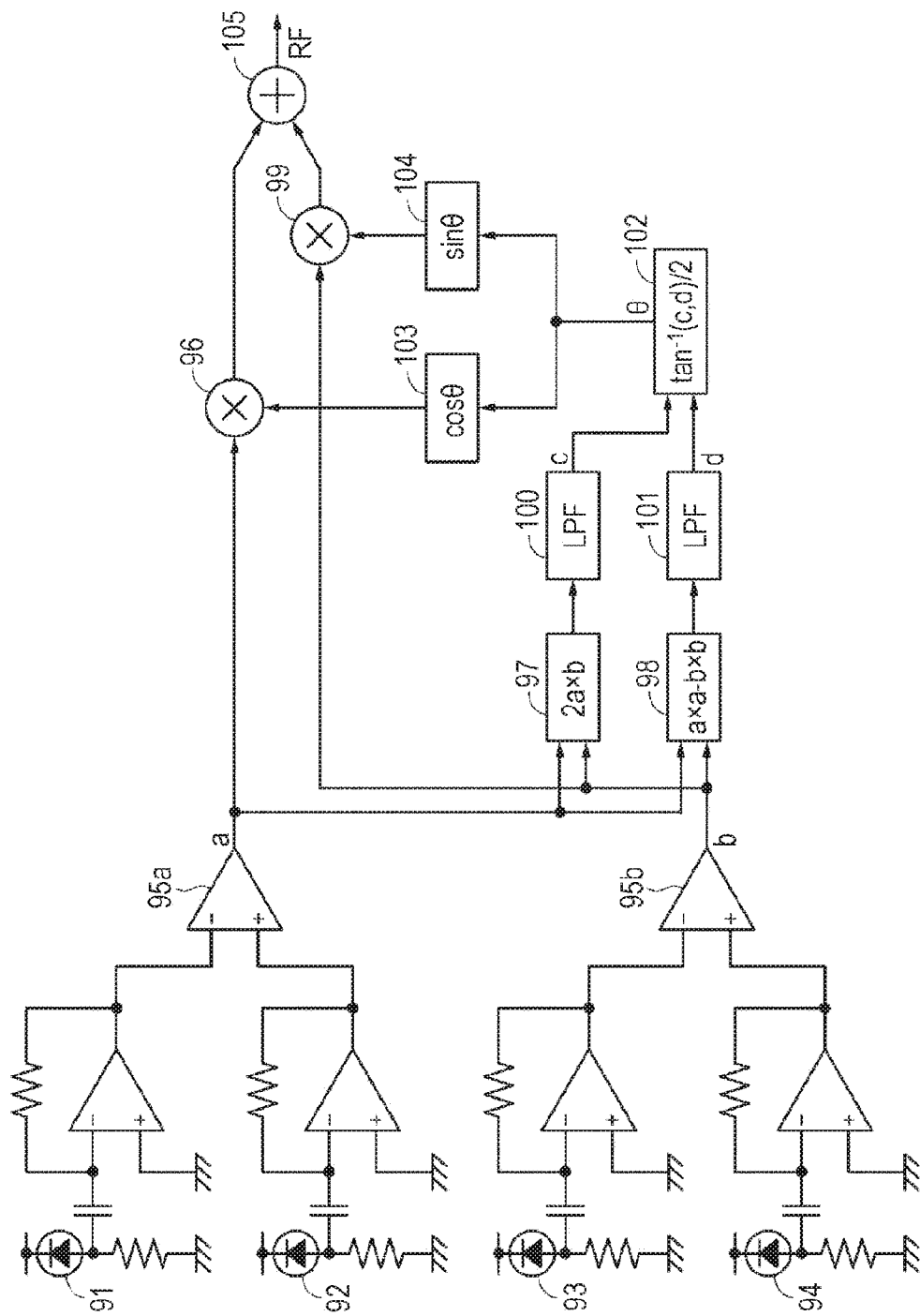
FIG. 16 is a block diagram of a configuration example of a phase extraction circuit.

FIG. 16 illustrates a configuration example of phase extraction. Output signals from photodetectors 91, 92, 93, and 94 equivalent to the light detection units 24 to 27 in the optical configuration illustrated in FIG. 5 are processed by subtraction circuits 95a and 95b to form differential signals a and b. The differential signal a is supplied to a multiplication circuit 96, an arithmetic operation circuit 97, and an arithmetic operation circuit 98. The differential signal b is supplied to a multiplication circuit 99, an arithmetic operation circuit 97, and an arithmetic operation circuit 98.

The arithmetic operation circuit 97 generates an output of (2a*b), and an output signal from the arithmetic operation circuit 97 is supplied to a low-pass filter 100. The low-pass filter 100 generates an output c. The arithmetic operation circuit 98 generates an output of (a*a−b*b), and an output signal from the arithmetic operation circuit 98 is supplied to a low-pass filter 101. The low-pass filter 101 generates an output d.

The output c of the low-pass filter 100 and the output d of the low-pass filter 101 are supplied to an arithmetic operation circuit 102. The arithmetic operation circuit 102 determines the phase θ by performing an operation of (arctan(c, d)/2). The phase θ is supplied to signal generation circuits 103 and 104. The signal generation circuit 103 generates a cosine wave (cos θ) and supplies the signal to the multiplication circuit 96. The signal generation circuit 104 generates a sine wave (sin θ) and supplies the signal to the multiplication circuit 99.

An output signal from the multiplication circuit 96 and an output signal from the multiplication circuit 99 are supplied to an addition circuit 105. The multiplication circuit 96 detects synchronously the differential signal a, and the multiplication circuit 99 detects synchronously the differential signal b. The RF signal is retrieved from the addition circuit 105.

[Reference Light Servo]

Figure 17:
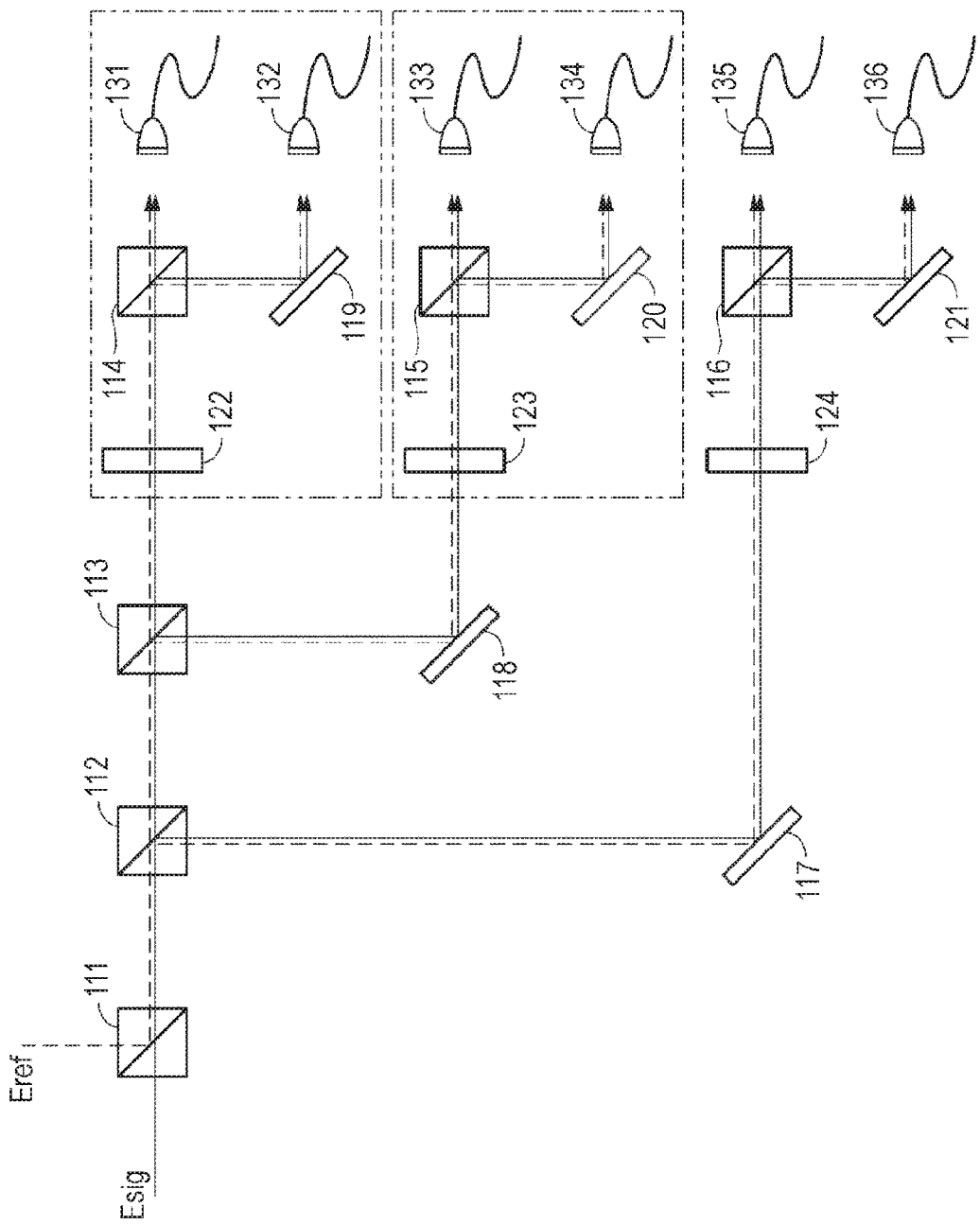
FIG. 17 is a block diagram describing a reference light servo system.

The foregoing phase θ corresponds to the difference in light path length between the signal light and the reference light (resulting mainly from the surface deflection of the optical recording medium 1). To eliminate the influence of the phase shift, the reference light servo may be used to make the light path length of the reference light physically variable as illustrated in FIG. 17. For example, controlling the position of the mirror 18 in the optical system illustrated in FIG. 5 makes it possible to control the light path length of the reference light.

Referring to FIG. 17, signal light Esig and reference light Eref enter a polarization beam splitter 111. The signal light is a signal with a mixture of land signals EL and EG. The optical system illustrated in FIG. 17 includes polarization beam splitters 114, 115, and 116, half beam splitters 112 and 113, a (½) wavelength plate 122, a (¼) wavelength plate 123, a wavelength plate 124, and photodetectors 131 to 136. The reference light servo is performed with the use of the outputs of the photodetectors 135 and 136. The wavelength plate 124 is provided to set the phase difference to (π/8).

When an output signal from the photodetector 135 is designated as IPD5 and an output signal from the photodetector 136 is designated as IPD6, the differential value (IPD5−IPD6) is represented by Mathematical Formula (17) as follows:

[Mathematical Formula 17]

$$I_{PD5} - I_{PD6} = \qquad (17)$$
$$I_{calc3} \propto |E_{ref}|\{|E_L|\cos(\theta - \phi_{ref} + \frac{\pi}{4}) + |E_G|\sin(\theta - \phi_{ref} + \frac{\pi}{4})\}$$

The reference light servo is performed such that a difference Icalc3 represented by Mathematical Formula (17) becomes zero. This makes it possible to cancel out the phase difference between the signal light and the reference light. In the case where Icalc3 is 0, (θ−φref)=π/2. When an output signal from the photodetector 131 is designated as IPD1, an output signal from the photodetector 132 is designated as IPD2, an output signal from the photodetector 133 is designated as IPD3, and an output signal from the photodetector 134 is designated as IPD4, the differential values are represented by Mathematical Formulas (18) and (19) as shown below. These differential values are independent signals of the land and the groove.

[Mathematical Formula 18]

$$I_{PD1} - I_{PD2} = I_{calc1} = |E_L||E_{ref}|\cos(\theta - \phi_{ref}) - |E_G||E_{ref}|\sin(\theta - \phi_{ref}) = |E_L||E_{ref}| \qquad (18)$$

[Mathematical Formula 19]

$$I_{PD3}-I_{PD4}=I_{calc2}=|E_L||E_{ref}|\sin(\theta-\phi_{ref})+|E_G||E_{ref}|\cos(\theta-\phi_{ref})=|E_G||E_{ref}|$$ (19)

In the reference light servo, a servo signal for controlling the position of the mirror for formation of the reference light is obtained from the value of the difference between the output signals from the photodetectors 135 and 136 as described above. Alternatively, the phase θ may be extracted in the configuration illustrated in FIG. 17 so that the reference light servo is performed with the extracted phase θ as a servo signal. In that case, there is no need to provide the half beam splitter 112, the mirror 117, the wavelength plate 124, the beam splitter 116, the mirror 121, and the photodetectors 135 and 136 illustrated in FIG. 17.

According to the playing method in the embodiment of the present disclosure described above, the signals recorded with a narrow pitch under the optical limit value are reproduced by the homodyne detection. The relations among the beam spot of the playing light formed on the recording surface, the lands L, and the groove G are as illustrated in FIG. 3. FIG. 3 illustrates an example of the case in which the tracking servo control of the object lens is performed on the grooves G.

In this case, it is understood that the information recorded on the land L includes a mixture of the information recorded on two lands L adjacent to the groove G as a servo target. Consequently, although the lands L and the grooves G may be separately readable, it is difficult to reproduce the recorded signals of the lands L in a proper manner.

Note that in the case where the lands L are subjected to the tracking servo, the information recorded on the grooves G has a similar mixture.

However, the tracking control method makes it possible to suppress mixture of information between the lands L and between the grooves G and read the information recorded on the land L and the information recorded on the groove G at the same time in one spot. Such tracking servo with simultaneous reading may be employed.

The embodiments of the present disclosure have been specifically described so far. However, the present disclosure is not limited to the foregoing embodiments but can be modified in various manners on the basis of the technical idea of the present disclosure. For example, the wavelength of the laser light source may not be 405 nm.

Further, the playing optical system is not limited to the configuration illustrated in FIG. 5 but may be a homodyne detection optical system to obtain four kinds of light-receiving signals I to L, for example. The homodyne detection optical system has a Wollaston prism that can generate light with each phase differences of 0, 90, 180, 270 degrees.

In addition, the configurations, methods, processes, shapes, materials, numeric values, and the like of the foregoing embodiments can be combined with one another without deviating from the gist of the present disclosure.

Note that, the present disclosure can be configured as follows:

(1)
A playing apparatus including:
an optical system that irradiates a recording medium on which signals are recorded in both a land and a groove with light emitted from a light source to obtain signal light reflecting both recorded signals of the land and the groove, generates reference light from the light emitted from the light source, and generates a set of first signal light and reference light with a phase difference of almost 0 degree from overlapping light of the signal light and the reference light, a set of second signal light and reference light with a phase difference of almost 180 degrees from the same, a set of third signal light and reference light with a phase difference of almost 90 degrees from the same, and a set of fourth signal light and reference light with a phase difference of almost 270 degrees from the same;

a light-receiving unit that receives the set of first signal light and reference light by a first light-receiving element, the set of second signal light and reference light by a second light-receiving element, the set of third signal light and reference light by a third light-receiving element, and the set of fourth signal light and reference light by a fourth light-receiving element;

an arithmetic operation unit that calculates a first differential signal as a difference between a first light-receiving signal obtained by the first light-receiving element and a second light-receiving signal obtained by the second light-receiving element, and calculates a second differential signal as a difference between a third light-receiving signal obtained by the third light-receiving element and a fourth light-receiving signal obtained by the fourth light-receiving element;

a first FIR filter and a second FIR filter to which the first differential signal and the second differential signal are supplied, respectively; and an equalization error detection unit that is supplied with an addition signal in which output signals from the first and second FIR filters are added up to form an equalization error, wherein tap coefficients for the first and second FIR filters are controlled to minimize the equalization error.

(2)
The playing apparatus according to (1), wherein a phase is determined in accordance with a difference in light path length between the first to fourth signal light and the reference light from the first differential signal and the second differential signal, and the first differential signal and the second differential signal have a component of the phase.

(3)
The playing apparatus according to (1) or (2), wherein a phase offset is given in advance to the first differential signal and the second differential signal.

(4)
The playing apparatus according to any one of (1) to (3), wherein the phase offset is almost equal to ($\Psi=4\pi nd/\lambda$) (n represents refractive index, d represents a level difference between the land and the groove, and λ represents light wavelength).

(5)
The playing apparatus according to any one of (1) to (4), wherein the reference light is generated by reflecting the light emitted from the light source on a mirror.

(6)
A playing method including:
irradiating a recording medium on which signals are recorded in both a land and a groove with light emitted from a light source to obtain signal light reflecting both recorded signals of the land and the groove, generating reference light from the light emitted from the light source, and generating by an optical system a set of first signal light and reference light with a phase difference of almost 0 degree from overlapping light of the signal light and the reference light, a set of second signal light and reference light with a phase difference of almost 180 degrees from the same, a set of third signal light and reference light with a phase difference of almost 90 degrees from the same, and a set of fourth signal light and reference light with a phase difference of almost 270 degrees from the same;

receiving the set of first signal light and reference light by a first light-receiving element, the set of second signal light and reference light by a second light-receiving element, the set of third signal light and reference light by a third light-receiving element, and the set of fourth signal light and reference light by a fourth light-receiving element;

calculating a first differential signal as a difference between a first light-receiving signal obtained by the first light-receiving element and a second light-receiving signal obtained by the second light-receiving element, and calculates a second differential signal as a difference between a third light-receiving signal obtained by the third light-receiving element and a fourth light-receiving signal obtained by the fourth light-receiving element;

supplying the first differential signal and the second differential signal to a first FIR filter and a second FIR filter, respectively;

supplying an addition signal in which output signals from the first and second FIR filters are added up to an equalization error detection unit to form an equalization error; and controlling tap coefficients for the first and second FIR filters to minimize the equalization error.

REFERENCE SIGNS LIST

1 Optical recording medium
10 Laser
15 Object lens
54a and 54b FIR filter
56 Viterbi detector
57a and 57b LMS processor
71 Phase extraction circuit

The invention claimed is:

1. A playing apparatus comprising:
an optical system that:
irradiates a recording medium on which signals are recorded in both a land and a groove with light emitted from a light source, wherein the recording medium is irradiated to obtain signal light that reflects both recorded signals of the land and the groove;
generates reference light from the light emitted from the light source; and
generates a first set of first signal light and reference light with a phase difference of 0 degree from overlapping light of the signal light and the reference light, a second set of second signal light and reference light with a phase difference of 180 degrees from the overlapping light of the signal light and the reference light, a third set of third signal light and reference light with a phase difference of 90 degrees from the overlapping light of the signal light and the reference light, and a fourth set of fourth signal light and reference light with a phase difference of 270 degrees from the overlapping light of the signal light and the reference light;
a light-receiving unit that receives the first set of first signal light and reference light by a first light-receiving element, the second set of second signal light and reference light by a second light-receiving element, the third set of third signal light and reference light by a third light-receiving element, and the fourth set of fourth signal light and reference light by a fourth light-receiving element;

an arithmetic operation unit that calculates a first differential signal as a difference between a first light-receiving signal obtained by the first light-receiving element and a second light-receiving signal obtained by the second light-receiving element, and calculates a second differential signal as a second difference between a third light-receiving signal obtained by the third light-receiving element and a fourth light-receiving signal obtained by the fourth light-receiving element;
a first FIR filter and a second FIR filter, wherein the first differential signal is supplied to the first FIR filter and the second differential signal is supplied, to the second FIR filter; and
an equalization error detection unit that is supplied with an addition signal in which output signals from the first and second FIR filters are added up to form an equalization error, wherein
tap coefficients for the first FIR filter and the second FIR filter are controlled to minimize the equalization error.

2. The playing apparatus according to claim 1, wherein a phase is determined in accordance with a third difference in light path length between the first to fourth signal light and the reference light from the first differential signal and the second differential signal, and wherein the first differential signal and the second differential signal have a component of the phase.

3. The playing apparatus according to claim 1, wherein a phase offset is given in advance to the first differential signal and the second differential signal.

4. The playing apparatus according to claim 3, wherein the phase offset is equal to ($\Psi=4\pi nd/\lambda$) (n represents refractive index, d represents a level difference between the land and the groove, and $\lambda$ represents light wavelength).

5. The playing apparatus according to claim 1, wherein the reference light is generated by reflecting the light emitted from the light source on a mirror.

6. A playing method comprising:
irradiating a recording medium on which signals are recorded in both a land and a groove with light emitted from a light source, wherein the recording medium is irradiated to obtain signal light that reflects both recorded signals of the land and the groove;
generating reference light from the light emitted from the light source;
generating, by an optical system, a first set of first signal light and reference light with a phase difference of 0 degree from overlapping light of the signal light and the reference light, a second set of second signal light and reference light with a phase difference of 180 degrees from the overlapping light of the signal light and the reference light, a third set of third signal light and reference light with a phase difference of 90 degrees from the overlapping light of the signal light and the reference light, and a fourth set of fourth signal light and reference light with a phase difference of 270 degrees from the overlapping light of the signal light and the reference light;
receiving the first set of first signal light and reference light by a first light-receiving element, the second set of second signal light and reference light by a second light-receiving element, the third set of third signal light and reference light by a third light-receiving element, and the fourth set of fourth signal light and reference light by a fourth light-receiving element;
calculating a first differential signal as a first difference between a first light-receiving signal obtained by the first light-receiving element and a second light-receiving signal obtained by the second light-receiving element, and calculates a second differential signal as a second difference between a third light-receiving signal obtained by the third light-receiving element and a fourth light-receiving signal obtained by the fourth light-receiving element;

supplying the first differential signal to a first FIR filter and the second differential signal to a second FIR filter;

supplying an addition signal in which output signals from the first and second FIR filters are added up to an equalization error detection unit to form an equalization error; and controlling tap coefficients for the first and second FIR filters to minimize the equalization error.

* * * * *